United States Patent [19]
Muraro

[11] 3,727,583
[45] Apr. 17, 1973

[54] TOY FOR AMUSEMENT OF CATS
[76] Inventor: Robert J. Muraro, 3008 E. Pratt Street, Baltimore, Md.
[22] Filed: Mar. 9, 1971
[21] Appl. No.: 122,469

[52] U.S. Cl.................................119/29, 46/59
[51] Int. Cl.................................A01k 15/00
[58] Field of Search.................119/29, 29.5; 46/132, 59

[56] References Cited

UNITED STATES PATENTS

| | | | |
|---|---|---|---|
| 2,246,965 | 6/1941 | Yoder | 119/29.5 |
| 2,807,117 | 9/1957 | Davies | 46/132 X |
| 545,958 | 9/1895 | Hoffmann | 46/132 |
| 3,328,910 | 7/1967 | Hughes | 46/132 |
| 2,859,731 | 11/1958 | Sutton | 119/29 X |
| 2,086,631 | 7/1937 | Munro | 119/29.5 |
| 2,833,244 | 5/1958 | Bohlman | 119/29 |

Primary Examiner—Hugh R. Chamblee
Assistant Examiner—James H. Czerwonky
Attorney—John F. McClellan, Sr.

[57] ABSTRACT

An amusement device for cats comprising a discontinuous yarn retracting and storing mechanism enclosed in a housing and adapted to pay out yarn retractably when the yarn is pulled by a cat being amused. The mechanism retracts the yarn silently and with an intermittent motion; a lure may be attached to the free end of the yarn, and the housing may be shaped like a ball of yarn. Means are provided to support the device on floors.

7 Claims, 4 Drawing Figures

PATENTED APR 17 1973 3,727,583

INVENTOR.
ROBERT J. MURARO
BY
John F. McClellan Jr.
ATTORNEY

TOY FOR AMUSEMENT OF CATS

This invention relates generally to toys and particularly to an amusement device especially adapted for the entertainment of cats.

The inventor has observed that domestic cats are amused for indefinite periods of time by the motions of a piece of yarn slowly, and preferably intermittently, dragged across the floor. Something in the feline nature finds an irresistible attraction in the silent, twitching progress, and both adult cats and kittens are tempted to engage in "cat and mouse" games with the yarn for long periods of time. Cats stalk, seize, pull on, and release the yarn, over and over.

Since few people today can devote all the time that their pet cats would have them devote to such games, it is an object of the present invention to provide an automatic toy to simulate the part played in such games by humans sufficiently well that cats can amuse themselves.

Other objects of this invention are to provide a toy for cats which is adapted for both indoor and outdoor use, and which in suitable sizes is adapted for diversion of both domestic and caged felines.

Further objects are to provide a cat toy as described which is reliable, attractive in appearance, silent in operation, durable, safe, and which is very economical to manufacture and sell.

In an exemplary preferred form the invention comprises an enclosing housing having inside a windlass mechanism, with a spring for turning the windlass which is adapted to pay out and retrieve line without necessity for rewinding, a silent escapement which is ratchet-connected to operate only in the retrieval mode to provide discontinuous retrieval, and an opening in the housing for passage of the line.

The above and other advantages and objects of the invention will become more apparent on examination of the following description, including the drawings in which.

Figure 1:
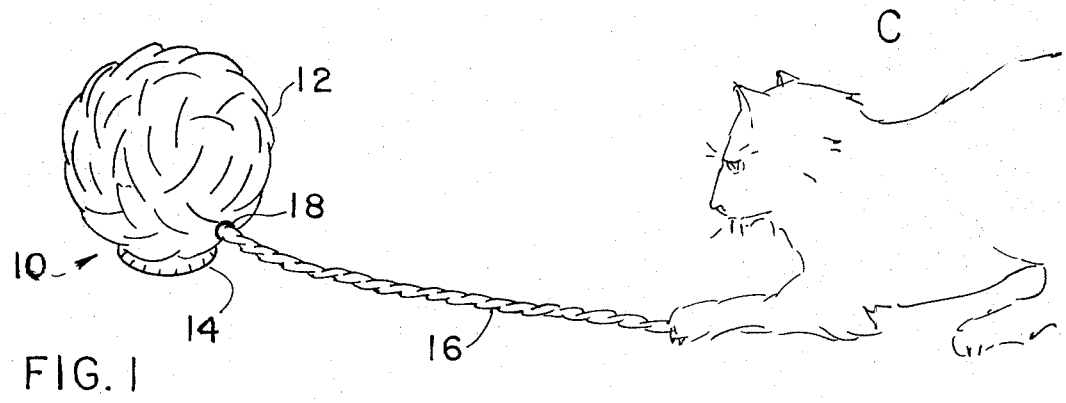
FIG. 1 is a perspective view of a cat-amusing toy made according to this invention.

Turning now to FIG. 1 in detail, the cat amusement toy 10 of this invention is shown in use for the intended purpose by a cat C.

The housing 12 of the toy, shown in the shape of a ball of yarn, is supported on a base 14, which may be a suction cup, to stabilize the toy. The housing is preferably of some attractive color commonly found in yarns.

A line 16, preferably of stout, durable yarn or the like is led out of the housing through an aperture 18 and extended some distance across the floor, rug, or other surface on which the animal is playing.

Initial extension of the line by the human winds a retrieval mechanism within the housing and when the line is released retrieval begins. Attention of the cat is immediately attracted and it inevitably and instinctively catches the line, stopping the retrieval. When the line is released, the cat again is induced to pounce on it by the motion of the line.

Tension of the retrieving device is made weak enough so that the cat can not only stop retrieval, but can also strip additional line from the device, and, as will be seen, the toy is adapted to retrieve any additional amount payed out, up to the maximum storage capacity of the device.

After some experience cats learn to begin the game themselves by seizing line and pulling a length of it out of the housing. From this point on the cat and toy system becomes self-sufficient, with daily benefits to the cat of amusement, exercise and training, and with dividends to the owner from observing the cat at play.

The line length is chosen such that when the toy mechanism is at rest, some length of line remains extended from the housing to avoid necessity for opening the housing to rethread the line through the opening.

Figures 2, 4:
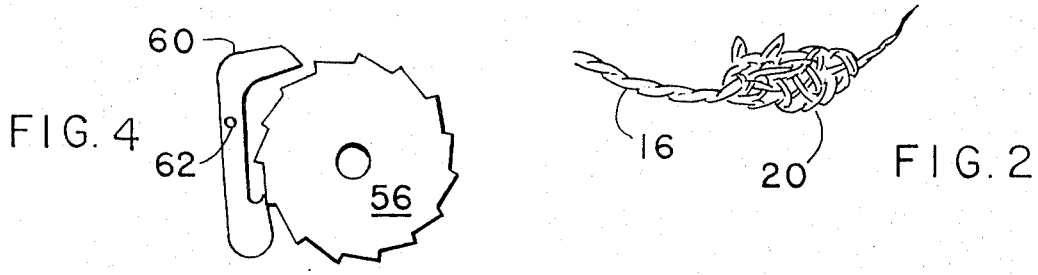
FIG. 2 is a detail showing a mouse-like lure formed on the free end of the line of the device of FIG. 1.
FIG. 4 is a detail taken at 4—4 of FIG. 3.

FIG. 2 shows a means whereby this becomes unnecessary, and further, whereby cats can grasp the line better. The opening 18 in the housing, as shown in FIG. 1, is little larger than the diameter of the line. This is purposeful. According to an important feature of the invention no moving mechanism inside the housing is allowed to remain visible, since such motion distracts cats and frustrates them, since their attention is then divided, and since they are incapable of dealing effectively with complex moving parts.

According to the FIG. 2 provision, the small opening in the housing also serves to prevent the free end of the line from being drawn into the housing by the mechanism. A "mouse" or similarly shaped lure 20, which may be formed of the yarn of the line, is integrally attached at the free end of the line. The lure is made large enough not to pass through aperture 18, and thus remains available to cats at all times. The additional bulk of material also enables cats to grasp the lure and to draw out additional line more effectively. As an added feature, the lure 20 may be stuffed with catnip.

Figure 3:
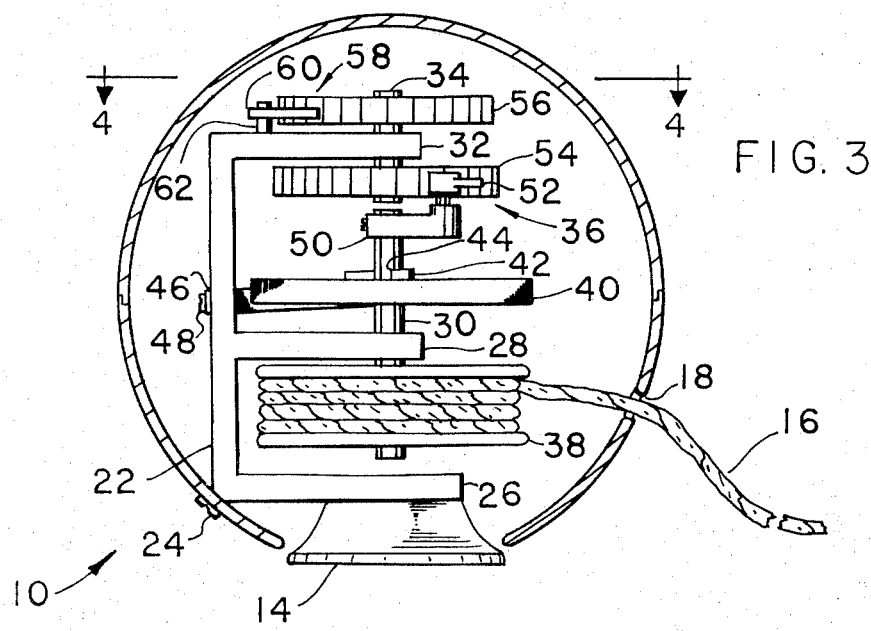
FIG. 3 is a side elevation partially in section of a mechanism adapted to retrieve line intermittently and store it as for the FIG. 1 embodiment.

FIG. 3 shows, in partial section, an elevation of exemplary mechanism within the housing, and details of the housing, of toy 10.

Operation of the mechanism will be described in more detail after the following description of the parts, but a brief overall indication of the operation is as follows.

Pulling out the line turns a shaft-mounted spool on which it is stored. Turning the shaft-mounted spool winds a clock spring. When the line is released, the clockspring is prevented from retrieving the line all at once by an escapement, which imposes an intermittent retrieval.

The escapement acts only in the retrieval direction; a ratchet release allows the line to be stripped off the spool without interference by the escapement.

Details of the mechanism are as follows:

The middle arm 28 of the E-shaped frame rotatively supports a shaft 30, and the upper arm 32 rotatively supports another shaft 34. The shafts are in alignment. They are connected by a spring pawl mechanism 36 in such manner that shaft 30 can be rotated in a direction which is clockwise, looking down, without rotating the upper shaft 34; but will rotate the upper shaft if turned in the opposite, or counter-clockwise direction.

The lower shaft, 30, has a windlass spool affixed to it for storage of line 16. Above the spool, a long, softly coiled spring 40 is affixed to the shaft 30 by the inner end 42 which passes through a slot 44 in the shaft. The other end 46 of the coil spring is attached to the housing by a screw 48.

Pawl mechanism 36, which was mentioned as connecting the shafts, comprises a pawl arm 50 screwed to the upper end of the lower shaft and a pivotal ratchet 52 at the end of the pawl arm. The pivotal ratchet contact should be rubber coated for silence.

The ratchet 52 extends across the space between the shafts and engages a ratchet gear 54 fixedly mounted on the lower end of the upper shaft 34.

A similar ratchet gear 56 is fixed on the upper end of the upper shaft, and is engaged by an escapement 58. The escapement consists of a pivotal double ratchet 60 and a pivot post 62 for the double ratchet. The pivot post is affixed on the upper arm 32 of the E-shaped bracket.

FIG. 4 shows the escapement in plan. This is a silent ratchet, especially chosen for that quality. Construction and operation details are given on page 34 of Volume 1 of "Ingenious Mechanisms" seventh printing, The Industrial Press, 148 Lafayette St., New York, N. Y., but the device is essentially shown in FIG. 4. No spring is used, but post 62 preferably makes a light frictional-fit with the double ratchet.

Operation of the entire mechanism is as previously indicated: spool 38 winds spring 40 when line is stripped out. Ratchet release 36 prevents interference with the stripping of the line. When the line is released, the spring 40 acts to rewind the line. However, since the lower shaft turns in the opposite direction during rewinding, ratchet release 36 becomes locked to ratchet gear 54, turning shaft 34 and ratchet gear 56. Escapement 59 prevents rapid rotation of ratchet gear 56 and thus of both shafts and the line spool, and additionally imposes intermittent or "twitching" mode of retrieval on the line, which is attractive to cats.

The housing preferably is in two parts as indicated, to permit easy replacement of yarn when it become frayed, and is secured to the E-shaped frame 22 by a screw 24. The lowest arm 26 of the E-shaped frame is secured to the base 14 by a screw (not shown).

Space between the base and the housing is kept to a minimum to reduce noise and prevent motion from being observed.

Obviously, many modifications and variations of the present invention are possible in light of the above teachings. It is, therefore, to be understood that within the scope of the appended claims the invention may be practiced otherwise than as specifically described.

I claim:

1. An amusement device comprising: means for supporting the amusement device on floors and the like, flexible elongate means, and means integral with the supporting means for moving the flexible elongate means intermittently across floors and the like including means for discontinuously retrieving and storing the flexible elongate means, the means for discontinuously retrieving and storing being arranged to pay out the flexible elongate means retrievably when pulled by a cat, thereby providing means for a cat to play "cat and mouse" with the line.

2. An amusement device for cats as recited in claim 1, wherein the flexible elongate means is a line, and wherein the means for discontinuously retrieving and storing the line has a close fitting line aperture and has elsewhere a substantially completely enclosing housing.

3. An amusement device for cats as recited in claim 2, wherein the line has a free end and a lure on the free end.

4. An amusement device for cats as recited in claim 3, wherein the lure comprises a knotted portion of said line.

5. An amusement device for cats as recited in claim 3, wherein the means for discontinuously retrieving and storing the line is arranged to be substantially silent in operation.

6. An amusement device as recited in claim 5, wherein the supporting means comprises a base supporting said housing and wherein the base has stabilizing means therein.

7. An amusement device for cats as recited in claim 6, wherein the stabilizing means comprises a suction cup for affixing the housing to floors and the like.

* * * * *